(12) United States Patent
Lee

(10) Patent No.: US 7,315,432 B2
(45) Date of Patent: Jan. 1, 2008

(54) TRACK-SEEK CONTROL METHOD OF HDD AND RECORDING MEDIUM SUITABLE FOR THE SAME

(75) Inventor: Jung-ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/263,800

(22) Filed: Nov. 2, 2005

(65) Prior Publication Data

US 2006/0139792 A1    Jun. 29, 2006

(30) Foreign Application Priority Data

Dec. 29, 2004   (KR) .................. 10-2004-0115049

(51) Int. Cl.
*G11B 5/596* (2006.01)
(52) U.S. Cl. .................................. 360/78.06
(58) Field of Classification Search ............... None
See application file for complete search history.

(56) References Cited

U.S. PATENT DOCUMENTS 5,675,558 A  *  10/1997  Katoh .................. 369/30.15
6,140,791 A  *  10/2000  Zhang ...................... 318/632

FOREIGN PATENT DOCUMENTS

KR    2001-62386    7/2001
KR    2001-67380    7/2001

* cited by examiner

*Primary Examiner*—K. Wong
(74) *Attorney, Agent, or Firm*—Staas & Halsey LLP

(57) ABSTRACT

A seek control method of smoothly changing to a coast mode and a deceleration mode in a track-seek control device according to a multi-sinusoidal acceleration trajectory, a recording medium suitable for the same, and an HDD adopting the same. The method includes: calculating time of an accelerating duration from a position trajectory corresponding to a maximum seek distance that can be reached without the coast mode; calculating a position trajectory for a seek control including a coasting duration based on the time of the accelerating duration; calculating an acceleration trajectory and a velocity trajectory corresponding to the calculated position trajectory; and performing the seek control including the coast mode using the calculated acceleration trajectory, velocity trajectory, and position trajectory. Accordingly, in the seek control of the HDD including the coast mode, the coast mode can be smoothly controlled by obtaining the time of an acceleration duration from a position trajectory for track-seeking without the coast mode and calculating an acceleration trajectory, a velocity trajectory, and a position trajectory for a seek including the coast mode based on the obtained time of the acceleration duration.

4 Claims, 8 Drawing Sheets

NORMALIZED ACCELERATION, VELOCITY, POSITION TRAJECTORY

TRACK-SEEK CONTROL METHOD OF HDD AND RECORDING MEDIUM SUITABLE FOR THE SAME

CROSS REFERENCE TO RELATED APPLICATION

This application claims the priority of Korean Patent Application No. 10-2004-0115049, filed on Dec. 29, 2004, in the Korean Intellectual Property Office, the disclosure of which is incorporated herein in its entirety by reference.

BACKGROUND OF THE INVENTION

1. Field of the Invention

The present invention relates to a method and apparatus for controlling a hard disc drive (HDD), and more particularly, to a seek control method of smoothly changing to a coast mode and a deceleration mode in a track-seek control device according to a multi-sinusoidal acceleration trajectory, a recording medium suitable for the same, and an HDD adopting the same.

2. Description of the Related Art

A hard disc drive (HDD) includes a plurality of magnetic transducers for writing and reading information by magnetizing a disc and sensing a magnetic field on the disc. The information is stored on concentric tracks. Each track has a unique disc number and track number. In a plurality of discs, tracks having the same track number are called a cylinder. Therefore, each track can be defined by number of the cylinder.

Each transducer is typically integrated in a slider assembled with a head gimbal assembly (HGA). Each HGA is attached to an actuator arm. The actuator arm has a voice coil, which is located adjacent to a magnetic assembly specifying (supporting) a voice coil motor (VCM) together. The HDD typically includes a driving circuit, which supplies a current for exciting the VCM, and a controller. The excited VCM rotates the actuator arm to move the transducers across surfaces of the discs.

When writing or reading the information, the HDD may perform a track-seek control routine for moving the transducer from one cylinder to another. During the track-seek control routine, the VCM is excited to move the transducer from a certain cylinder to a new cylinder. The controller controls the current for exciting the VCM to move the transducer exactly to a target cylinder and a center of the track.

It is preferable to minimize the time required to read or write information from or on discs. Therefore, the track-seek control routine performed by the HDD needs to move the transducer to a new cylinder position as quickly as possible. In addition, a settling time of the HGA should be minimized so that the transducers can write or read the information as quickly as possible.

In a conventional method, the track-seek control is performed to move the transducer to a target track using a square wave acceleration trajectory. Unfortunately, a square wave includes harmonic waves of high frequencies. These harmonic waves result in a mechanical resonance in a HGA and thereby cause mechanical components or assemblies to vibrate. In addition, residual vibration incurs audible noise. In addition, the mechanical resonance generated by the track-seek control method using the conventional square wave acceleration trajectory causes an increase of both of the settling time required to write or read information on or from discs and an entire seek time.

A technology developed to resolve this problem is a track-seek control method using a sinusoidal acceleration trajectory. A track-seek controller using the sinusoidal acceleration trajectory has advantages in terms of vibration and audible noise as compared with the track-seek control method using the square wave acceleration trajectory.

FIG. 1 is a block diagram of a conventional track-seek control apparatus 100 using a sinusoidal acceleration trajectory.

Referring to FIG. 1, the track-seek control apparatus 100 includes a sinusoidal trajectory generator 102, a notch filter 116, a VCM driver 126, a head/disc assembly (HDA) 128, and a state estimator 104.

The track-seek control apparatus 100 performs a track-seek control routine for moving a transducer from a track to a target track located at a distance of a track-seek distance $K_{SK}$.

The sinusoidal trajectory generator 102 generates a position $y^*(k)$, a velocity $v^*(k)$, and an acceleration $a^*(k)$ based on the sinusoidal acceleration trajectory at every sampling period $T_S$.

In order to obtain values of sine and cosine functions to generate the sinusoidal acceleration trajectory, the sinusoidal trajectory generator 102 can sample the values of sine and cosine functions according to the sampling period $T_S$, store the sampled values in a ROM table (not shown), and read the stored values in reference to the sampling period $T_S$.

The ROM table stores the values of sine and cosine functions at a first sampling period with respect to a plurality of representative frequencies. The values of sine and cosine functions at the first sampling period with respect to a frequency between the representative frequencies are determined by interpolation. Here, the frequency corresponds to a track-seek distance and a seek time. That is, if the track-seek distance is determined, the seek time, i.e., the frequency of a sinusoidal signal, is determined based on the determined track-seek distance.

FIG. 2 is a diagram illustrating normalization of a position trajectory y, a velocity trajectory v, and an acceleration trajectory a in a conventional sinusoidal seek. Here, a time axis is normalized with respect to a track-seek time $T_{SK}$. That is, FIG. 2 shows the position trajectory y, the velocity trajectory v, and the acceleration trajectory a when the track-seek time $T_{SK}$ is 1.

Referring to FIG. 2, the track-seek time $T_{SK}$ corresponds to one period of the sinusoidal acceleration trajectory a. Also, a transducer is moved to the track-seek distance $K_{SK}$ for the track-seek time $T_{SK}$ by controlling the transducer to have the sinusoidal acceleration trajectory a.

The state estimator 104 outputs an estimated position y(k) and estimated velocity v(k) of the transducer based on positions at previous samples k-1, k-2, . . . and a position at a current sample k of the transducer.

A track position, i.e., a track number, is obtained by a gray code recorded in a sector area of a disc, and the transducer reads the gray code while moving on the disc. The gray code read by the transducer is input to the state estimator 104.

The track-seek control apparatus 100 using a sinusoidal acceleration trajectory shown in FIG. 1 improves the settling time and reduces the audible noise generated by the square wave seek control method. However, in the sinusoidal seek control method, the seek time is increased around 10% as compared with the square wave seek control method. The reason can be understood by comparing a sine wave with a square wave. An occupying area of the sine wave is smaller than that of the square wave, which has the same amplitude each other, in one period. Each of the occupying areas is corresponding to an amount of current to accelerate and decelerate a VCM motor. Since the amount of current to accelerate or decelerate the VCM motor is smaller in the sinusoidal seek control method than in the square wave seek control method, the amount of driving of the VCM motor is smaller. Meanwhile the seek time is longer in the sinusoidal seek control method than in the square wave seek control method.

A multi-sinusoidal seek control method has been developed to improve this disadvantage. The multi-sinusoidal seek control method is disclosed in Korean Patent Publication Nos. 2001-62386, which was filed on Jul. 7, 2001, and 2001-67380, which was filed on Jul. 12, 2001. While the sinusoidal seek control method uses one sine wave, the multi-sinusoidal seek control method uses a harmonic wave obtained by synthesizing at least two sine waves.

FIG. 3 is a diagram illustrating an acceleration trajectory used in the multi-sinusoidal seek control method. The acceleration trajectory is obtained by synthesizing a plurality of sine waves having different frequencies respectively. An accelerating duration is depicted of being symmetrical to a decelerating duration in FIG. 3. However, in most cases, the accelerating duration and the decelerating duration are asymmetrical. A main reason of the asymmetry is because multiple sinusoidal acceleration trajectories are synthesized. Besides, the reason is because the residual vibration of the mechanical components is reduced and a ratio of the accelerating duration to the decelerating duration is varied in order to reduce the settling time. This is obtained by varying a synthesizing ratio of the sine waves.

Typically, the seek control has an acceleration mode, a deceleration mode, and a coast mode in which an actuator is coasted at a maximum design speed for long distance seeking. In general, a maximum value of a current input to a VCM in the seek control is limited to a predetermined value in consideration of performance and mechanical vibration of the VCM. That is, in the acceleration mode, the maximum design speed of the actuator is limited to the maximum value of the current. Also, since an acceleration trajectory and a deceleration trajectory should be symmetrical if at all possible, the deceleration mode is performed after the actuator reaches the maximum velocity. Accordingly, a distance, which can be sought only with the acceleration mode and the deceleration mode, is limited. Therefore, the coast mode is necessary to seek a distance longer than a predetermined distance.

FIG. 4 is a diagram illustrating an acceleration trajectory for the seek control including the coast mode in the multi-sinusoidal seek control method. In the coast mode, a value of the current input to the VCM is 0. In detail, velocity of the actuator is accelerated by applying current on a VCM in the acceleration mode, and when the velocity of the actuator is maximum, i.e., at a position A of FIG. 4, the acceleration mode is changed to the coast mode by blocking the current input to the VCM. The actuator is not accelerated any more and is coasted at a maximum speed by inertia. After coasting for a predetermined distance, the coast mode is changed to the deceleration mode at a position B. In the deceleration mode, the velocity of the actuator is decelerated by applying opposite current on the VCM. Accordingly, the actuator stops on a target track. For accurate seek control, the change to the coast mode and the change to the deceleration mode should be accurately controlled. The accurate control is more important when considering that the actuator moves at the maximum speed in the coast mode.

However, as described in FIG. 3, it is difficult to perform the coast mode due to the asymmetry of the acceleration mode and the deceleration mode for a plurality of reasons. In other words, the time (A of FIG. 4) when the velocity of the actuator is maximum in the acceleration mode varies, and if the change to the coast mode and the change to the deceleration mode are not exactly performed in accordance with the times A and B, respectively, accurate seek control cannot be achieved.

Also, if the mode change times are not exactly matched to the times A and B, audible noise is generated due to vibration of the actuator, and in a severe case, the seek fails.

In the conventional sinusoidal seek control method, entering the coast mode is simply performed at the half of a maximum seek time corresponding to the case without the coast mode.

Accordingly, since the change to the coast mode and the change to the deceleration mode are not smoothly performed in a multi-sinusoidal seek, the seek fails, or a seek time is delayed.

SUMMARY OF THE INVENTION

Additional aspects and/or advantages of the invention will be set forth in part in the description which follows and, in part, will be apparent from the description, or may be learned by practice of the invention.

The present invention provides a method of exactly controlling an entry to a coast mode and an entry to a deceleration mode by accurately calculating a position trajectory in a seek control including the coast mode in a hard disc drive (HDD) using a multi-sinusoidal seek method.

The present invention also provides a computer readable recording medium having recorded thereon a computer readable program for performing the track-seek control method.

The present invention also provides an HDD to which the track-seek control method is applied.

According to an aspect of the present invention, there is provided a seek control method of a hard disc drive (HDD) using a multi-sinusoidal acceleration trajectory including a coast mode, the method including: calculating time of an accelerating duration from a position trajectory corresponding to a maximum seek distance that can be reached without the coast mode; calculating a position trajectory for a seek control including a coasting duration based on the time of the accelerating duration; calculating an acceleration trajectory and a velocity trajectory corresponding to the calculated position trajectory; and performing the seek control including the coast mode using the calculated acceleration trajectory, velocity trajectory, and position trajectory.

The time of the accelerating duration may be calculated by a maximum seek time*a reaching distance of the accelerating duration/the maximum seek distance in the maximum seek distance that can be reached without the coast mode.

According to another aspect of the present invention, there is provided a computer readable recording medium having recorded thereon a computer readable program for performing a track-seek control method using a multi-sinusoidal acceleration trajectory including a coast mode, the method including: calculating time of an accelerating duration from a position trajectory corresponding to a maximum seek distance that can be reached without the coast mode; calculating a position trajectory for a seek control including a coasting duration based on the time of the accelerating duration; calculating an acceleration trajectory and a velocity trajectory corresponding to the calculated position trajectory; and performing the seek control including the coast mode using the calculated acceleration trajectory, velocity trajectory, and position trajectory.

According to another aspect of the present invention, there is provided a hard disc drive (HDD) including: a disc storing predetermined information; a spindle motor rotating the disc; a transducer writing information on the disc and reading information from the disc; a voice coil motor (VCM) driver driving a VCM moving the transducer across a surface of the disc; and a controller generating a current for driving the VCM to move the transducer in accordance with a sinusoidal acceleration trajectory corresponding to a track seek distance, where the controller performs: calculating time of an accelerating duration from a position trajectory corresponding to a maximum seek distance that can be reached without the coast mode; calculating a position trajectory for a seek control including a coasting duration based on the time of the accelerating duration; calculating an acceleration trajectory and a velocity trajectory corresponding to the calculated position trajectory; and performing the seek control including the coast mode using the calculated acceleration trajectory, velocity trajectory, and position trajectory.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Hereinafter, the present invention will now be described more fully with reference to the accompanying drawings, in which embodiments of the invention are shown.

The present invention provides a method of calculating an exact position trajectory in a seek control including a coast mode of a hard disc drive (HDD) using a multi-sinusoidal seek method. A smooth change to a coast mode and a smooth change to a deceleration mode can be achieved by applying the calculated position trajectory to the seek control.

In the present invention, the position trajectory for the coast mode is obtained based on a distance reached during an accelerating duration.

In detail, in a position trajectory with respect to a maximum seek distance that can be reached without the coast mode, i.e., a seek distance that can be reached during only the accelerating duration and a decelerating duration, a ratio of the maximum seek distance to a distance reached during the accelerating duration is obtained, and time of the accelerating duration is obtained using this ratio.

The exact position trajectory for the seek control including the coast mode is obtained by using the time of the accelerating duration and a coast distance.

Figure 5:
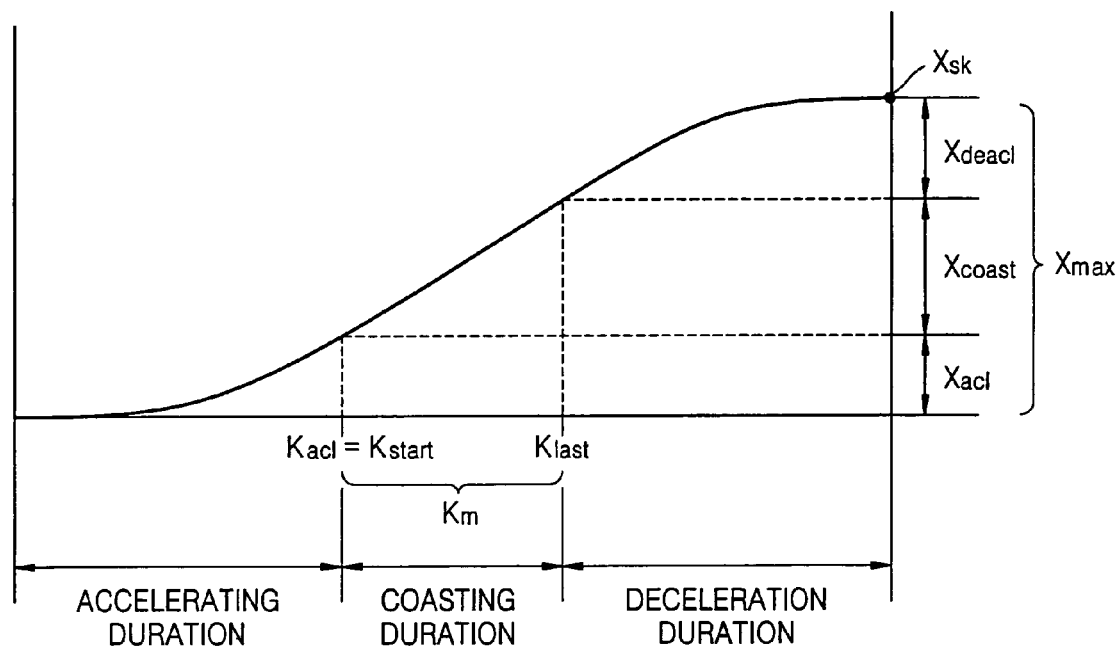
FIG. 5 is a diagram illustrating a position trajectory required for a seek control including a coast mode.

FIG. 5 is a diagram illustrating the position trajectory required for the seek control including the coast mode.

In FIG. 5, the position trajectory in a coasting duration is shown as a straight line, since movement is performed in the coasting duration by inertia at a speed accelerated to in the accelerating duration.

The change to the coast mode is performed at the end of the accelerating duration, and the change to the deceleration mode is performed after reaching the coast distance.

Figure 6:
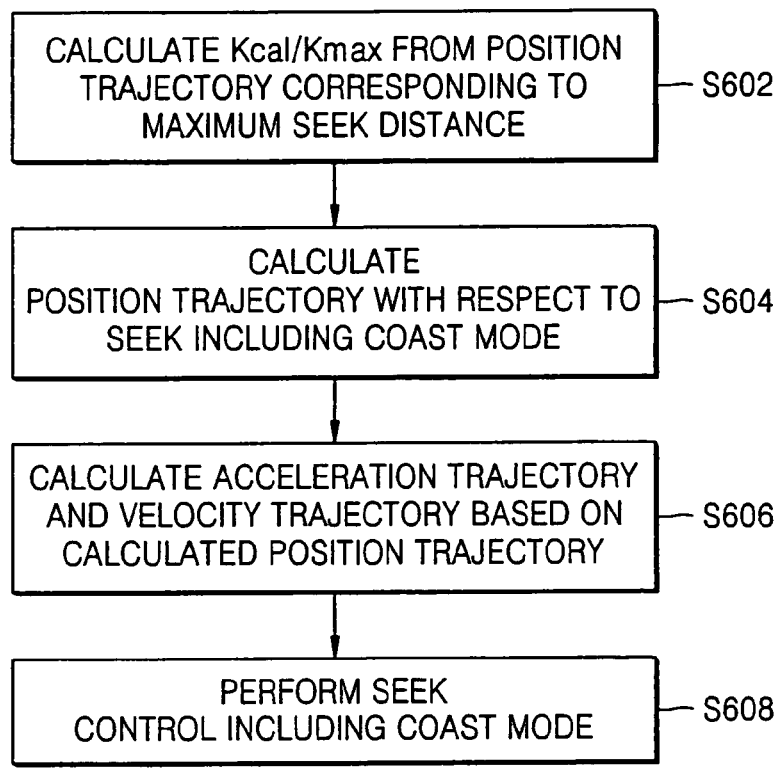
FIG. 6 is a flowchart illustrating a seek control method of a HDD according to an embodiment of the present invention.

FIG. 6 is a flowchart illustrating a seek control method of a HDD according to an embodiment of the present invention.

Before performing a seek control including the coast mode, by using an acceleration trajectory, a velocity trajectory, and a position trajectory, a ratio Xacl/Xmax of a distance Xacl traversed during the accelerating duration to a maximum seek distance Xmax corresponding to the maximum seek distance Xmax that can be reached without the coast mode, is determined.

Figure 7:
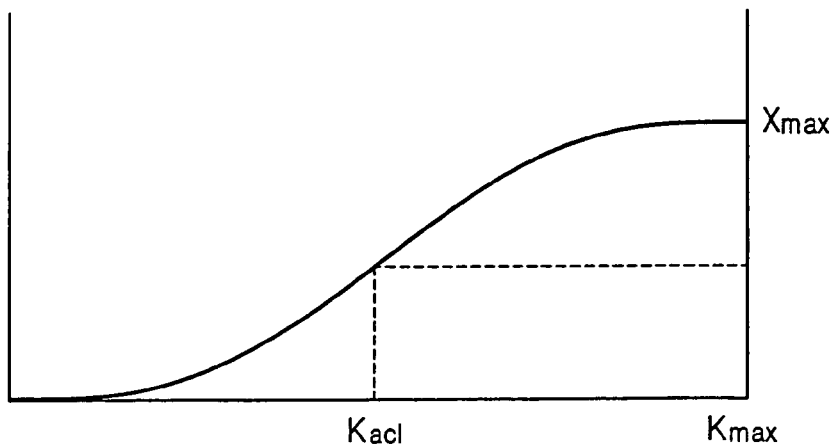
FIG. 7 is a diagram illustrating a position trajectory of a maximum seek distance that can be reached without the coast mode.

FIG. 7 is a diagram illustrating a position trajectory of the maximum seek distance Xmax that can be traversed without the coast mode.

The ratio Xacl/Xmax of the distance Xacl traversed during the accelerating duration to the maximum seek distance Xmax is obtained from the position trajectory in operation S602.

A time Kacl of the accelerating duration is obtained using the ratio Xacl/Xmax.

Here, Kacl=Kmax*Xacl/Xmax, and Kmax is a maximum seek time, i.e., a seek time corresponding to the maximum seek distance Xmax that can be traversed without the coast mode.

Figure 4:
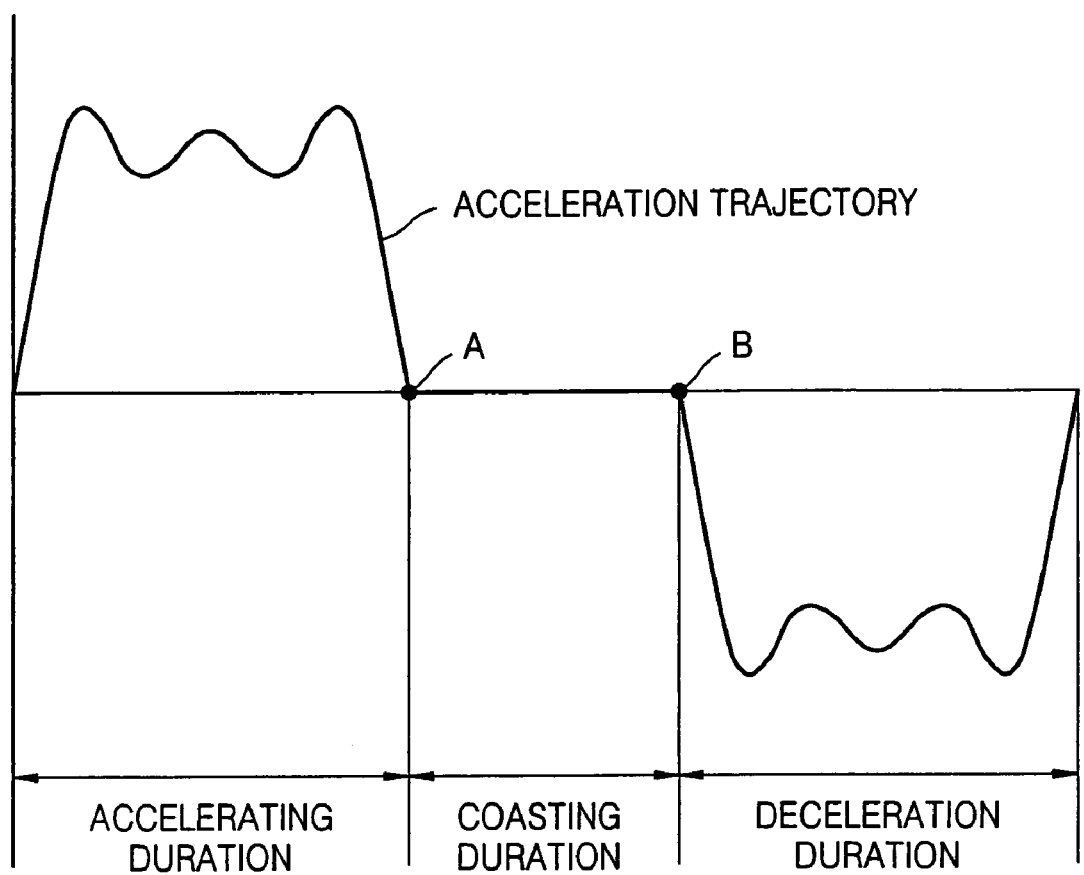
FIG. 4 is a diagram illustrating an acceleration trajectory for a seek control including a coast mode in the multi-sinusoidal seek control method.

The time Kacl of the accelerating duration corresponds to the time A of FIG. 4 and is represented by an order of servo samples. A head passes by tracks while moving for seeking, and a position of the head is confirmed by sampling the servo samples recorded on the tracks at the constant time interval Ts. The time Kacl of the accelerating duration can be presented by the order of the servo samples.

A position trajectory for a seek including the coast mode is calculated in operation S604.

1) The position trajectory in the accelerating duration is obtained by Equation 1.

$$x*(k) = X_0^* k + \sum_{n=1}^{N} X_{C,n}^* \left[1 - \cos\left(\frac{2\pi}{P_n}k\right)\right] - \sum_{n=1}^{N} X_{S,n}^* \sin\left(\frac{2\pi}{P_n}k\right) \quad \text{[Equation 1]}$$

Here, the former $\Sigma$ term denotes a sum of cosine functions, the latter $\Sigma$ term denotes a sum of sine functions, and $X_0^*$ is a coefficient of a linear function represented from synthesizing a plurality of sine waves. Also, n (n=1, ..., N)

is an index indicating one of harmonic waves used to generate a multi-sine wave, $P_n$ is a period of a sine wave, and k denotes the order of the servo samples, i.e., an elapsed time.

Here, the time of k=Kacl−1 is an entering time to the coast mode. Therefore, the position trajectory at a changing time to the coast mode can be obtained by substituting k=Kacl−1 into Equation 1.

2) The position trajectory in the coast mode is obtained as described below.

The position trajectory at a first Ts: Xstart; $X^*(k_{acl})$

The position trajectory at a second Ts: Xstart+1; $X^*(k_{acl})$+ Xcoast/Km

The position trajectory at a third Ts: Xstart+2; $X^*(k_{acl})$+ 2*Xcoast/Km

The position trajectory at a last Ts: Xlast; $X^*(k_{acl})$+Xcoast

Here, Xcoast denotes a distance moved in the coasting duration, Km denotes the time of the coasting duration represented as the number of servo samples. Xcoast is obtained by Xsk−Xmax, and Xsk denotes a seek distance to be moved by the seek control including the coast mode.

The final time of the coasting duration is Kacl+Km, a first time Kdeacl of the decelerating duration is Kacl+Km+1.

3) The position trajectory in the decelerating duration is obtained by Equation 2.

$$x*(k) = X_{coast} + X_0^*(k - K_{coast}) + \sum_{n=1}^{N} X_{C,n}^*\left[1 - \cos\left(\frac{2\pi}{P_n}k\right)\right] - \sum_{n=1}^{N} X_{S,n}^*\sin\left(\frac{2\pi}{P_n}k\right)$$ [Equation 2]

In operation S606, an acceleration trajectory and a velocity trajectory are obtained based on the position trajectory obtained in operation S604.

In operation S608, the seek control including the coast mode is performed using the acceleration trajectory, the velocity trajectory, and the position trajectory obtained in operations S604 and S606.

Figure 8:
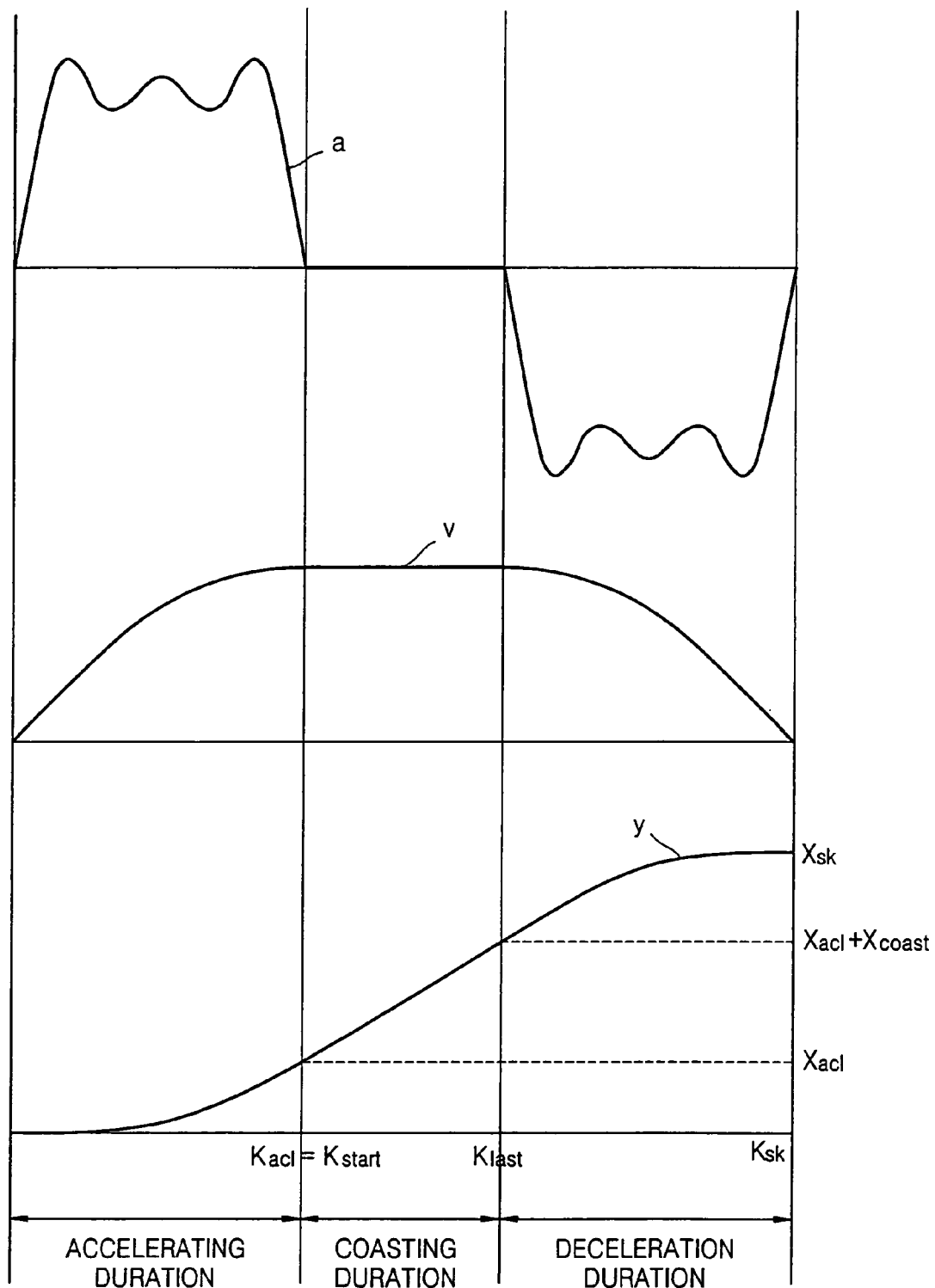
FIG. 8 is a diagram illustrating an acceleration trajectory a, a velocity trajectory v, and a position trajectory y for a seek control including the coast mode.

FIG. 8 is a diagram illustrating the acceleration trajectory a, the velocity trajectory v, and the position trajectory y for the seek control including the coast mode. The position trajectory y shown in FIG. 8 is obtained in operation S602.

Figure 1:
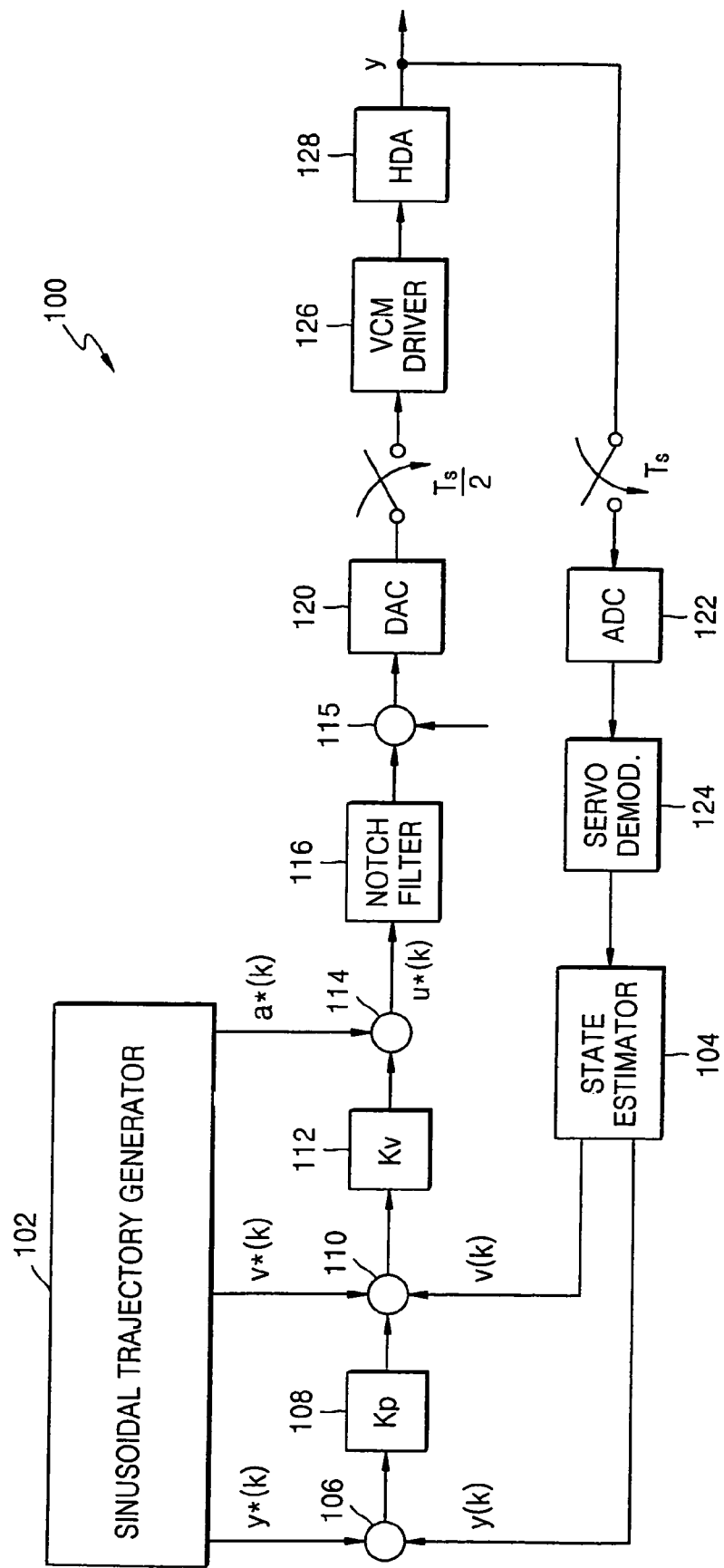
FIG. 1 is a block diagram of a conventional track-seek control apparatus using sinusoidal acceleration trajectories.
Figure 2:
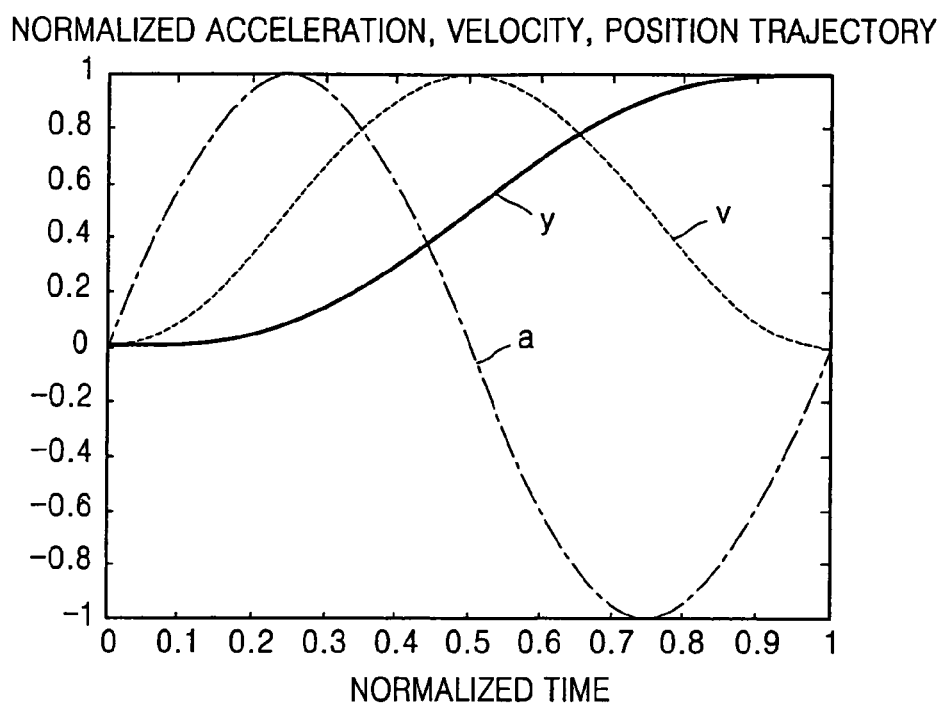
FIG. 2 is a diagram illustrating normalization of a position trajectory y, a velocity trajectory v, and an acceleration trajectory a in a conventional sinusoidal seek.
Figure 3:
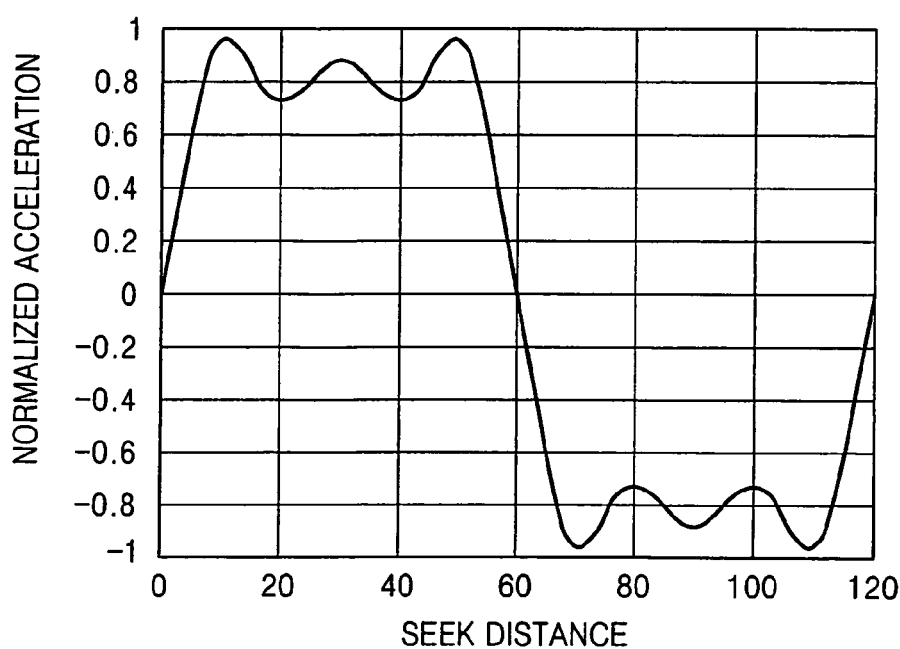
FIG. 3 is a diagram illustrating an acceleration trajectory used in a multi-sinusoidal seek control method.
Figure 9:
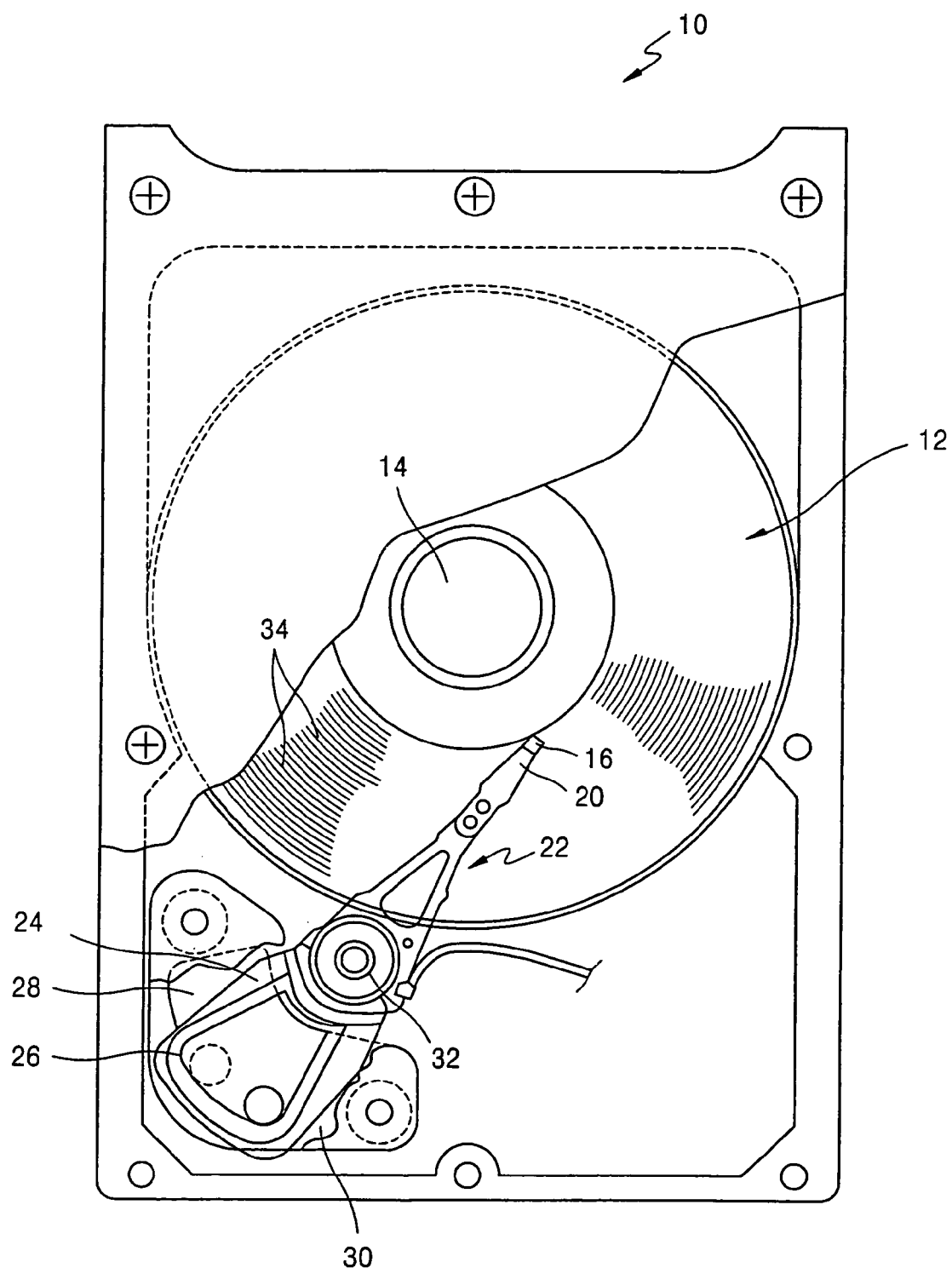
FIG. 9 is a schematic plan view of an HDD to which an embodiment of the present invention is applied.

FIG. 9 is a schematic plan view of an HDD 10 to which an embodiment of the present invention is applied. Referring to FIG. 1, the HDD 10 includes at least one disc 12 rotated by a spindle motor 14. The disc drive 10 also includes a transducer 16 adjacently located on a surface of the disc 12.

The transducer 16 can read or write information from or on the rotating disc 12 by sensing a magnetic field formed on the surface of the disc 12 or magnetizing the surface of the disc 12. Typically, the transducer 16 is located on the surface of the disc 12. Though a single transducer 16 is shown in FIG. 9, the transducer 16 must be understood to include a write transducer that magnetizes the disc 12 and a read transducer that senses a magnetic field of the disc 12. The read converter is composed of a magneto-resistive (MR) component.

The transducer 16 may be combined with a slider 20. The slider 20 generates an air bearing between the transducer 16 and the surface of the disc 12. The slider 20 is combined with a head gimbal assembly (HGA) 22. The HGA 22 is attached to an actuator arm 24 having a voice coil 26. The voice coil 26 is located adjacent to a magnetic assembly 28 specifying (supporting) a voice coil motor (VCM) 30. A current supplied to the voice coil 26 generates torque that rotates the actuator arm 24 around a bearing assembly 32. The rotation of the actuator arm 24 moves the transducer 16 across the surface of the disc 12.

Information is stored in concentric tracks 34 of the disc 12. In general, each track 34 includes a plurality of sectors. Each sector includes a data field and an identification field. The identification field is composed of a Gray code for identifying a sector and a track (cylinder). The transducer 16 moves across the surface of the disc 12 in order to read or write information from or on another track.

Figure 10:
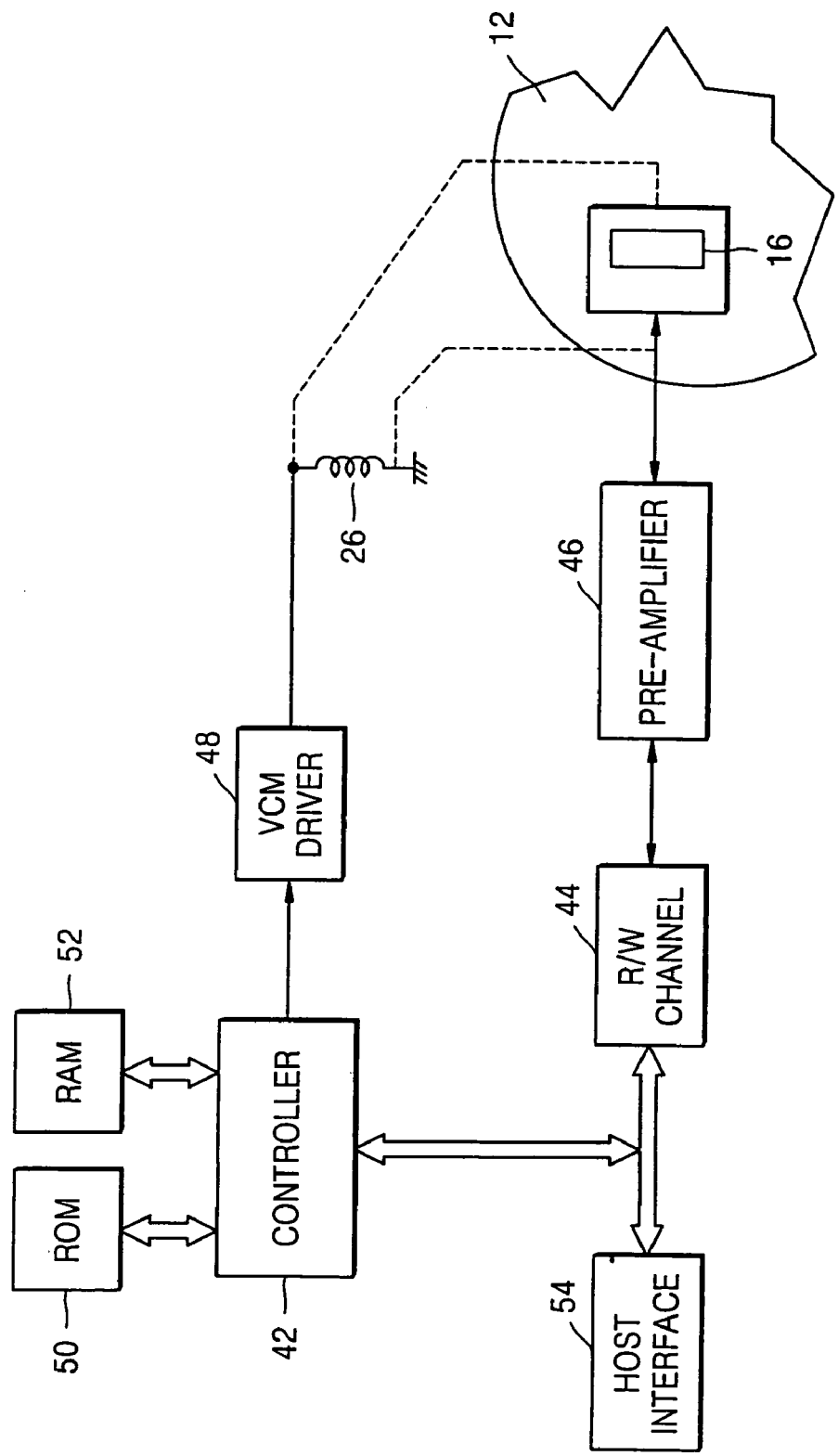
FIG. 10 is an electrical circuit configuration for controlling the HDD shown in FIG. 9.

FIG. 10 is a configuration of an electrical system 40 of for controlling the HDD 10 shown in FIG. 9. Referring to FIG. 10, the electrical system 40 includes a controller 42 connected to the transducer 16 through a write/read channel 44 and a pre-amplifier 46. The controller 42 may be a digital signal processor (DSP), a microprocessor, or a micro-controller. The controller 42 outputs a control signal to the write/read channel 44 in order to read or write information from or on the disc 12. The information is transmitted from the write/read channel 44 to a host interface 54. The host interface 54 includes a buffer memory (not shown) and a control circuit (not shown) for interfacing with a system such as a personal computer (PC).

The controller 42 is connected to a VCM driver 48 for supplying a driving current to the voice coil 26. The controller 42 outputs a control signal to the VCM driver 48 in order to control excitation of the VCM 30 and a motion of the transducer 16.

The controller 42 is connected to a nonvolatile memory 50, such as a read only memory (ROM) or a flash memory, and a random access memory (RAM) 52. The memories 50 and 52 include commands and data used by the controller 42 to perform software routines. A seek control routine of moving the transducer 16 from one track to another is one of the software routines. The seek control routine includes a servo control routine for guaranteeing that the transducer 16 is moved to an exact track. As an example, execution codes for performing the seek control method illustrated in FIG. 6 are stored in the ROM 50.

The present invention can be realized as a method, an apparatus, and/or a system. When the present invention is realized as software, components of the present invention are embodied as code segments for executing required operations. A program or the code segments can be stored in a processor readable recording medium and transmitted as computer data signals combined with a carrier using a transmission medium or a communication network. The processor readable recording medium is any data storage device that can store or transmit data which can be thereafter read by a computer system. Examples of the processor readable recording medium include electronic circuits, semi-conductor memory devices, read-only memory (ROM), flash memory, erasable ROM, floppy disks, optical discs, hard discs, optical fiber media, and RF networks. The computer data signals include any signal which can be propagated via transmission media such as electronic network channels, optical fibers, air, electronic fields, RF networks.

As described above, according to according to embodiments of the present invention, in a seek control of an HDD including a coast mode of a multi-sinusoidal seek method, the coast mode can be smoothly controlled by obtaining the time of an acceleration duration from a position trajectory for track-seeking without the coast mode and calculating an acceleration trajectory, a velocity trajectory, and a position trajectory for a seek including the coast mode based on the obtained time of the acceleration duration.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A seek control method of a hard disc drive (HDD) using a multi-sinusoidal acceleration trajectory including a coast mode, the method comprising:
    calculating time of an accelerating duration from a position trajectory corresponding to a maximum seek distance that can be reached without the coast mode;
    calculating a position trajectory for a seek control including a coasting duration based on the time of the accelerating duration;
    calculating an acceleration trajectory and a velocity trajectory corresponding to the calculated position trajectory; and
    performing the seek control including the coast mode using the calculated acceleration trajectory, velocity trajectory, and position trajectory.

2. The method of claim 1, wherein the time of the accelerating duration is calculated by a maximum seek time multiplied by a reaching distance of the accelerating duration divided by the maximum seek distance in the maximum seek distance that can be reached without the coast mode.

3. A computer readable recording medium having recorded thereon a computer readable program for performing a track-seek control method using a multi-sinusoidal acceleration trajectory including a coast mode, the method comprising:
    calculating time of an accelerating duration from a position trajectory corresponding to a maximum seek distance that can be reached without the coast mode;
    calculating a position trajectory for a seek control including a coasting duration based on the time of the accelerating duration;
    calculating an acceleration trajectory and a velocity trajectory corresponding to the calculated position trajectory; and
    performing the seek control including the coast mode using the calculated acceleration trajectory, velocity trajectory, and position trajectory.

4. A hard disc drive (HDD) comprising:
    a disc storing predetermined information;
    a spindle motor rotating the disc;
    a transducer writing information on the disc and reading information from the disc;
    a voice coil motor (VCM) driver driving a VCM moving the transducer across a surface of the disc; and
    a controller generating a current for driving the VCM to move the transducer in accordance with a multi-sinusoidal acceleration trajectory corresponding to a track seek distance,
    wherein the controller performs: calculating time of an accelerating duration from a position trajectory corresponding to a maximum seek distance that can be reached without the coast mode; calculating a position trajectory for a seek control including a coasting duration based on the time of the accelerating duration; calculating an acceleration trajectory and a velocity trajectory corresponding to the calculated position trajectory; and performing the seek control including the coast mode using the calculated acceleration trajectory, velocity trajectory, and position trajectory.

* * * * *